United States Patent
Manor et al.

(10) Patent No.: US 10,318,364 B2
(45) Date of Patent: Jun. 11, 2019

(54) METHODS AND SYSTEMS FOR PROBLEM-ALERT AGGREGATION

(71) Applicant: VISUAL PROCESS LIMITED, Bnei Zion (IL)

(72) Inventors: Raanan Manor, Haifa (IL); Chen Linchevski, Bnei Zion (IL)

(73) Assignee: VISUAL PROCESS LIMITED, Bnei Zion (IL)

( * ) Notice: Subject to any disclaimer, the term of this patent is extended or adjusted under 35 U.S.C. 154(b) by 154 days.

(21) Appl. No.: 15/440,081

(22) Filed: Feb. 23, 2017

(65) Prior Publication Data

US 2018/0239666 A1    Aug. 23, 2018

(51) Int. Cl.
| | |
|---|---|
| G06F 11/00 | (2006.01) |
| G06F 11/07 | (2006.01) |
| H04L 12/24 | (2006.01) |
| G05B 23/02 | (2006.01) |

(Continued)

(52) U.S. Cl.
CPC .......... *G06F 11/0754* (2013.01); *F02D 41/22* (2013.01); *F02D 41/2425* (2013.01); *G05B 23/0272* (2013.01); *G06F 11/0709* (2013.01); *H04L 41/0604* (2013.01);

(Continued)

(58) Field of Classification Search
CPC ............. G06F 11/0709; G06F 11/0754; G05B 23/0205; G05B 23/0216; G05B 23/0218; G05B 23/0243; G05B 23/0251; G05B 23/0267; G05B 23/0272; G05B 23/02745; G05B 2219/45018; G05B 2219/31469; G05B 2219/31472; G05B 17/00; G05B 19/0428; H04L 41/0631; H04L 41/065; H04L 41/0681

See application file for complete search history.

(56) References Cited

U.S. PATENT DOCUMENTS

| | | | |
|---|---|---|---|
| 6,889,096 B2 * | 5/2005 | Spriggs ................. | G05B 15/02 340/3.71 |
| 8,335,582 B2 * | 12/2012 | Shimshi ............ | G05B 19/0428 700/108 |
| 9,910,751 B2 * | 3/2018 | McElhinney ....... | G06F 11/0751 |

(Continued)

*Primary Examiner* — Marc Duncan
(74) *Attorney, Agent, or Firm* — Reuven K. Mouallem; FlashPoint IP Ltd.

(57) ABSTRACT

The present invention discloses methods and systems for problem-alert aggregation and identifying sub-optimal behavior. Methods include the steps of: providing data-driven alerts for an asset, wherein the data-driven alerts associate real-world data measured and/or detected from the asset, and wherein entities are physical objects and/or processes; providing an asset representation including interrelations between the objects, processes, and sensors associated with the entities of the asset; associating the data-driven alerts with the respective entities which are interrelated in the asset representation; aggregating the data-driven alerts into events, wherein the events are groupings of related data-driven alerts having related entities according to the asset representation; scoring each event into an event score, wherein the event score represents an event importance, an event urgency, an event relevance, and/or an event significance; and generating a selected subset of the events and respective event scores, wherein the selected subset is based on the event scores.

15 Claims, 3 Drawing Sheets

(51) Int. Cl.
*F02D 41/22* (2006.01)
*F02D 41/24* (2006.01)

(52) U.S. Cl.
CPC .... *H04L 41/0681* (2013.01); *F02D 2041/228* (2013.01); *G05B 2219/2637* (2013.01); *H04L 41/22* (2013.01)

(56) References Cited

U.S. PATENT DOCUMENTS

| | | | | |
|---|---|---|---|---|
| 10,078,317 | B2* | 9/2018 | Houmb | G06F 21/552 |
| 10,135,705 | B2* | 11/2018 | Asenjo | H04L 67/10 |
| 2006/0235962 | A1* | 10/2006 | Vinberg | H04L 41/0631 |
| | | | | 709/224 |
| 2011/0144777 | A1* | 6/2011 | Firkins | G05B 23/027 |
| | | | | 700/80 |
| 2012/0254792 | A1 | 10/2012 | Husoy et al. | |
| 2014/0258940 | A1* | 9/2014 | Han | G06F 3/0484 |
| | | | | 715/854 |
| 2016/0063845 | A1* | 3/2016 | Lloyd | G08B 21/187 |
| | | | | 340/679 |
| 2017/0046374 | A1* | 2/2017 | Fletcher | G06F 3/0484 |

* cited by examiner

METHODS AND SYSTEMS FOR PROBLEM-ALERT AGGREGATION

FIELD AND BACKGROUND OF THE INVENTION

The present invention relates to methods and systems for problem-alert aggregation and identifying sub-optimal behavior.

Predictive maintenance and failure detection are critical in many industries in which unpredicted problems may be costly, involving a host of adverse results including monetary loss, operational downtime, equipment loss, property damage, penalties, compensation, and sometimes even human fatality. To prevent such damages, many industrial plants install sensors to help monitor factory production and its processes. Machine-learning algorithms process the readings of such sensors, and alert the maintenance or security team when suspicious occurrences happen. Such alert-producing, machine-learning or data-mining algorithms vary, and include, for example, simple single-sensor threshold-crossing alerts, problem-specific alert scripts, problem-specific pattern-detection or likelihood-learning, trend-detection algorithms, prediction-deviation algorithms, deep-learning algorithms, and other anomaly-detection algorithms.

Due to the nature of complex systems, which include a large number of possible normal system states, and the fact that each alert can contain a large number of sensors, such algorithms typically produce false alarms with misdetection rates that can be mitigated with threshold settings, albeit with trade-offs. If the thresholds are set too high, there are fewer alerts, resulting however in a crisis possibly going unalerted. If the thresholds are set too low, there is an excessive number of alerts, resulting in the maintenance or security team, which tends to the alerts, commonly failing to investigate all the alerts, and possibly ignoring some or most of the alerts. As a result, most of the problems are not detected.

Once an alert is produced, it is passed to the maintenance or security team to investigate the cause. Since the alerts are the product of machine-learning algorithms, the alerts are expressed in machine-learning input terms, which are usually based on the headers of the columns in the monitoring system's database, or the names of the sensors that produce the alerts.

In order to investigate an alert, a maintenance team needs to identify the purpose and indications of the sensor or sensors that triggered the alert, distinguish the underlying relation between those sensors, and determine the real cause of the alert, which can often be very far from the identified sensors due the interconnectivity of such equipment/components. In complex industrial plants, the facility is often too big, and encompasses too many interlaced sub-systems, for the maintenance team to memorize the purpose and relations of each sensor to the other sensors in the alert, requiring additional reference information, sensor-layout diagrams, and facility experts to be involved in order to understand the nature and severity of the alert. Such additional resources are not always available.

Large facilities typically have robust process systems that are very reliable, meaning that failure of facility equipment (e.g., a boiler) is rare. Current alert systems characteristically have a high alert rate, usually hundreds per day. A maintenance team doesn't have the capacity to thoroughly investigate all alerts. Such facilities frequently employ high maintenance schedules and redundancy policies, which enable low workloads and alternative production procedures in case of machinery malfunction or failure. An alert-investigating team, which is aware of the low rate of real problems, may develop a tendency to ignore and dismiss alerts.

Present-day problem-detection systems currently have a detection rate in typical factories of around 2-3% of the actual problems. Complex critical plants cannot rely on existing problem-alert systems. Most complex plants employ system redundancy, and schedule redundant maintenance procedures, which increase production costs. In practice, there is no good solution to component-failure identification in complex plants.

Current problem-predicting systems produce the following.

1. Too many and/or unreliable alerts (e.g., often hundreds a day) are triggered, frequently designated as false alarms—misdetection rates make available general-purpose, problem-alert systems practically useless.
2. Alerts are generated that are associated with tags and text-like descriptors attached to the columns in the relevant database, which are not indicative of the problem to an investigating team, resulting in each alert requiring a complicated manual investigation in order to identify the problem, its location, and the cause of the alert—such investigations often fail to produce conclusions.

Most problems in complexes using present-day problem-detection systems are not prevented due to such poor detection rates and mislabeling as false alarms. Factory personnel frequently do not trust their own detection systems for early problem detection, or describe such systems as impractical due to the large number of alerts produced, forcing facility managers to institute redundant maintenance procedures in production facilities.

Modeling languages enable a user to model a machine, plant, factory, or system. Such modeling in current modeling languages requires an expert in the modeling language. Modeling languages typically have no stopping criteria (i.e., the ability to identify when the model has been completely represented), which further increases modeling time and complexity. Including a sensor as part of the model of the facility is possible in existing modeling languages, but requires a very detailed level of modeling, which is time-consuming. Moreover, sensors measure an attribute (i.e., property) of a part or process. Examples of such attributes include weight, importance, temperature, and pressure. Modeling sensors or data columns as parts of a component (e.g., an engine) don't capture their true function.

A possible solution is to associate metadata with the sensors in order to describe the attributes measured by the sensor. Such a solution is problematic because such attributes are not an integrated part of the model. Other issues of existing modeling languages are the expertise needed for performing the modeling, the modeling complexity, the lack of stopping criteria, and the inability to automate model queries.

It would be desirable to have methods and systems for problem-alert aggregation and identifying sub-optimal behavior in assets. Such methods and systems would, inter alia, overcome the various limitations mentioned above.

SUMMARY

It is the purpose of the present invention to provide methods and systems for problem-alert aggregation and identifying sub-optimal behavior.

It is noted that the term "exemplary" is used herein to refer to examples of embodiments and/or implementations, and is not meant to necessarily convey a more-desirable use-case. Similarly, the terms "alternative" and "alternatively" are used herein to refer to an example out of an assortment of contemplated embodiments and/or implementations, and is not meant to necessarily convey a more-desirable use-case. Therefore, it is understood from the above that "exemplary" and "alternative" may be applied herein to multiple embodiments and/or implementations. Various combinations of such alternative and/or exemplary embodiments are also contemplated herein.

For purposes of clarity, several terms which follow are specifically defined for use herein. The term "asset" is used herein to refer to a complex physical system having a purpose or main activity, and composed of a large number of interlaced entities, objects, parts, and processes, acting together to achieve the propose or main activity. Examples of such assets include industrial complexes, production facilities, chemical refineries, complex physical operations, complex machinery, automated machinery, self-driving vehicles, locomotives, boats, airplanes, complex computer programs, and biological systems.

The term "object" is used herein to refer to any physical item (i.e., something you can touch or access). The term "entity" is used herein to refer to the broader category of objects and/or processes. The terms "feature" or "attribute" are used herein to refer to a property of an entity. The term "sensor" is used herein to refer to a sensor, measurement, user labels, or a column in a database.

The term "asset representation" is used herein to refer to a model of an asset including not only the physical parts of the asset, but also characteristics of the asset such as asset processes, features, and sensors. The term "graph" is used herein to refer to a set of vertices connected by edges.

Embodiments of the present invention enable the aggregation of data-generated alerts produced by machine-learning algorithms. Such aggregation techniques utilize the asset representation of the specific asset, and produce fewer and higher-quality alerts than conventional systems. Such high-quality alerts are referred to herein as "events," which can pinpoint the identification, function, and location of defective parts in the asset causing the events. Such reliable and low-frequency events are simple to comprehend and check, assisting maintenance or security teams in investigating, understanding, and correcting a problem.

Embodiments of the present invention provide significant advantages including the following.

1. Events have significantly reduced alert rates (e.g., from a few hundred alerts per day to ten or less focused events per week).
2. Events localize the problematic part and/or problem in a facility, easing problem investigation.
3. Events are reliable—most, if not all, are true alerts, indicating real problems which require human intervention in factory processes, operator-induced changes, mitigation of external issues (e.g., due to weather-related disruptions), or correction of human error.
4. Event reliability builds the trust of maintenance or security teams, resulting in problem investigation being taken more seriously.
5. Streamlined event management reduces manufacturing/operating costs by eliminating asset redundancies, timing maintenance procedures, and preventing failures.

Embodiments of the present invention enable problem-alert aggregation by obtaining the following inputs.

A. Data-driven alerts—which are produced from real-world data, measured and/or detected on the asset and its entities. The alerts are produced by a data-mining, machine-learning, or deep-learning algorithm (e.g., sensor thresholds, problem-specific alert scripts, pattern detection of known problems, pattern likelihood of known problems, classification of known problems, abnormal-state detection, measurement deviation from an algorithm's predictions, trend detection, and new-cluster detection). In one embodiment, the alerts are produced by an anomaly-detection algorithm (e.g., based on Kernel Density Estimation (KDE)), with alert thresholds set very low, resulting in a high number of alerts, which is typically impractical for a human team to process.

B. Asset representation of the specific asset, whether a factory/plant structure, machine, chemical refinery, and/or production process—which includes all or some of the sensors that produced the data-driven alerts, with embodiments involving constructing a graph or graphs as detailed below, which are connected to data measurements.

Therefore, according to the present invention, there is provided for the first time a method for problem-alert aggregation, the method including the steps of: (a) providing data-driven alerts for an asset, wherein the data-driven alerts associate real-world data measured and/or detected from the asset, and wherein the asset is a complex physical system having a main activity, and wherein entities are physical objects and/or processes of the asset, and wherein the entities are adapted to act together to achieve the main activity; (b) providing an asset representation of the asset, wherein the asset representation includes interrelations between the objects, the processes, and sensors associated with the entities of the asset; (c) associating the data-driven alerts with the respective entities which are interrelated in the asset representation; (d) aggregating the data-driven alerts into events in the asset representation, wherein the events are groupings of related data-driven alerts having related entities according to the asset representation; (e) scoring each event into an event score, wherein the event score represents an event importance, an event urgency, an event relevance, and/or an event significance; and (f) generating a selected subset of the events and respective event scores, wherein the selected subset is based on the event scores.

Alternatively, at least one event is identified as belonging to at least one specifically-identified event selected from the group consisting of: an asset failure, a problematic entity, a faulty sensor, a user-induced change, a maintenance procedure, a user error, an inactive object, a problematic entity, an inactive object component, an object component requiring maintenance, a faulty object component, a leaking pipe, a defective product produced by an entity or the asset, and a problematic chemical sample produced by an entity or the asset.

Alternatively, the step of aggregating includes: (i) extracting designated sub-representations of the respective entities; and (ii) aggregating similar and/or connected designated sub-representations, or deviations from the designated sub-representations, into a designated event.

According to the present invention, there is provided for the first time a method for producing an interconnected representation of a complex physical operation for identifying sub-optimal behavior, the method including the steps of: (a) creating a sensor listing, wherein the sensor listing includes all relevant sensors, all relevant measurements, and/or all relevant sensor-data columns in a database, related to the real-world data measured and/or detected in an asset, wherein the asset is a complex physical system having a main activity, and wherein entities are physical objects and/or processes of the asset, and wherein the entities are adapted to act together to achieve the main activity; (b) creating an object listing, wherein the object listing includes at least one relevant object in the asset; (c) creating a process listing, wherein the process listing includes at least one relevant process in the asset; (d) creating a set of entity connections by associating listing elements in the sensor listing, the object listing, and the process listing; (e) iterating the steps (b)-(d) to refine the object listing, the process listing, and the entity connections until all relevant objects, and all relevant processes in the asset are properly listed and correspondingly associated into an asset representation of the asset, thereby producing the interconnected representation; and (f) identifying, by utilizing the asset representation, at least one relevant object or at least one relevant process which is impairing the asset from optimally performing, conducting, and/or achieving the main activity or a sub-aspect of the main activity.

Alternatively, the step of iterating includes iterating to refine the process listing and the entity connections until each relevant sensor listed relates to a given object or a given process, and each relevant process listed relates at least two different objects from the object listing.

Alternatively, the object listing includes object attributes associated with the objects, and wherein the process listing includes process attributes associated with the processes, wherein the object attributes and the process attributes are properties of their respectively associated entities, and wherein the sensor listing includes categorical values associated with the relevant sensors and the relevant measurements, and wherein the step of identifying includes identifying at least one relevant object attribute, at least one relevant process attribute, or at least one relevant categorical value which is impairing the asset from optimally performing, conducting, and/or achieving the main activity or a sub-aspect of the main activity.

Alternatively, the asset representation is configured to produce equivalent replies to a predefined set of queries as a manual investigation of the asset.

Alternatively, the asset representation is configured to be portrayed as an Asset Data Graph (ADG), wherein the ADG is a graph with a set of vertices connected with edges, configured to be queried automatically, and wherein the ADG is configured to produce equivalent replies to a predefined set of queries as the asset representation.

Alternatively, the asset representation is configured to be portrayed as a graph, wherein the graph is a set of vertices connected with edges, configured to be queried automatically, and wherein the graph is the basis on which a machine-learning algorithm or a deep-learning algorithm can be executed.

Alternatively, the method further includes the step of: (g) extracting an entity importance of at least one entity, of a linkage between at least two entities, and/or of the real-world data associated with at least one entity, wherein the entity importance is based on: (i) the asset representation or a derivative representation of the asset representation; and (ii) the real-world data measured and/or detected from the relevant sensors associated with the asset representation or with a derivative representation of the asset representation.

Alternatively, the method further includes the step of: (g) predicting at least one attribute value of at least one entity in the asset, wherein at least one attribute value is based on: (i) the asset representation or a derivative representation of the asset representation; and (ii) the real-world data measured and/or detected from the relevant sensors associated with the asset representation or with a derivative representation of the asset representation.

According to the present invention, there is provided for the first time a system for problem-alert aggregation, the system including: (a) a CPU for performing computational operations; (b) a memory module for storing data; (c) an alert-aggregation module configured for: (i) providing data-driven alerts for an asset, wherein the data-driven alerts associate real-world data measured and/or detected from the asset, and wherein the asset is a complex physical system having a main activity, and wherein entities are physical objects and/or processes of the asset, and wherein the entities are adapted to act together to achieve the main activity; (ii) providing an asset representation of the asset, wherein the asset representation includes interrelations between the objects, the processes, and sensors associated with the entities of the asset; (iii) associating the data-driven alerts with the respective entities which are interrelated in the asset representation; (iv) aggregating the data-driven alerts into events in the asset representation, wherein the events are groupings of related data-driven alerts having related entities according to the asset representation; (v) scoring each event into an event score, wherein the event score represents an event importance, an event urgency, an event relevance, and/or an event significance; and (vi) generating a selected subset of the events and respective event scores, wherein the selected subset is based on the event scores.

According to the present invention, there is provided for the first time a non-transitory computer-readable storage medium, having computer-readable code embodied on the non-transitory computer-readable storage medium, for problem-alert aggregation, the computer-readable code including: (a) program code for providing data-driven alerts for an asset, wherein the data-driven alerts associate real-world data measured and/or detected from the asset, and wherein the asset is a complex physical system having a main activity, and wherein entities are physical objects and/or processes of the asset, and wherein the entities are adapted to act together to achieve the main activity; (b) program code for providing an asset representation of the asset, wherein the asset representation includes interrelations between the objects, the processes, and sensors associated with the entities of the asset; (c) program code for associating the data-driven alerts with the respective entities which are interrelated in the asset representation; (d) program code for aggregating the data-driven alerts into events in the asset representation, wherein the events are groupings of related data-driven alerts having related entities according to the asset representation; (e) program code for scoring each event into an event score, wherein the event score represents an event importance, an event urgency, an event relevance, and/or an event significance; and (f) program code for generating a selected subset of the events and respective event scores, wherein the selected subset is based on the event scores.

According to the present invention, there is provided for the first time a system for producing an interconnected representation of a complex physical operation for identifying sub-optimal behavior, the system including: (a) a CPU for performing computational operations; (b) a memory module for storing data; (c) an asset-representation module configured for: (i) creating a sensor listing, wherein the sensor listing includes all relevant sensors, all relevant measurements, and/or all relevant sensor-data columns in a database, related to the real-world data measured and/or detected in an asset, wherein the asset is a complex physical system having a main activity, and wherein entities are physical objects and/or processes of the asset, and wherein the entities are adapted to act together to achieve the main activity; (ii) creating an object listing, wherein the object listing includes at least one relevant object in the asset; (iii) creating a process listing, wherein the process listing includes at least one relevant process in the asset; (iv) creating a set of entity connections by associating listing elements in the sensor listing, the object listing, and the process listing; (v) iterating the module functions (ii)-(iv) to refine the object listing, the process listing, and the entity connections until all relevant objects, and all relevant processes in the asset are properly listed and correspondingly associated into an asset representation of the asset, thereby producing the interconnected representation; and (vi) identifying, by utilizing the asset representation, at least one relevant object or at least one relevant process which is impairing the asset from optimally performing, conducting, and/or achieving the main activity or a sub-aspect of the main activity.

According to the present invention, there is provided for the first time a non-transitory computer-readable storage medium, having computer-readable code embodied on the non-transitory computer-readable storage medium, for producing an interconnected representation of a complex physical operation for identifying sub-optimal behavior, the computer-readable code including: (a) program code for creating a sensor listing, wherein the sensor listing includes all relevant sensors, all relevant measurements, and/or all relevant sensor-data columns in a database, related to the real-world data measured and/or detected in an asset, wherein the asset is a complex physical system having a main activity, and wherein entities are physical objects and/or processes of the asset, and wherein the entities are adapted to act together to achieve the main activity; (b) program code for creating an object listing, wherein the object listing includes at least one relevant object in the asset; (c) program code for creating a process listing, wherein the process listing includes at least one relevant process in the asset; (d) program code for creating a set of entity connections by associating listing elements in the sensor listing, the object listing, and the process listing; (e) program code for iterating the program-code functions (b)-(d) to refine the object listing, the process listing, and the entity connections until all relevant objects, and all relevant processes in the asset are properly listed and correspondingly associated into an asset representation of the asset, thereby producing the interconnected representation; and (f) program code for identifying, by utilizing the asset representation, at least one relevant object or at least one relevant process which is impairing the asset from optimally performing, conducting, and/or achieving the main activity or a sub-aspect of the main activity.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE ILLUSTRATIVE EMBODIMENTS

The present invention relates to methods and systems for problem-alert aggregation and identifying sub-optimal behavior. The principles and operation for providing such methods and systems, according to the present invention, may be better understood with reference to the accompanying description and the drawings.

An Asset Data Graph (ADG) described herein accurately depicts an asset representation if the results of a predefined set of queries are identical on both the graph and the asset representation. Similarly, an asset representation depicts the asset if the results of the predefined set of queries for the asset representation and a human expert are identical. Therefore, having a graph for an ADG enables the replacement of queries to a human expert by employing standard query libraries on the ADGs derived from the asset representation.

Figure 1:
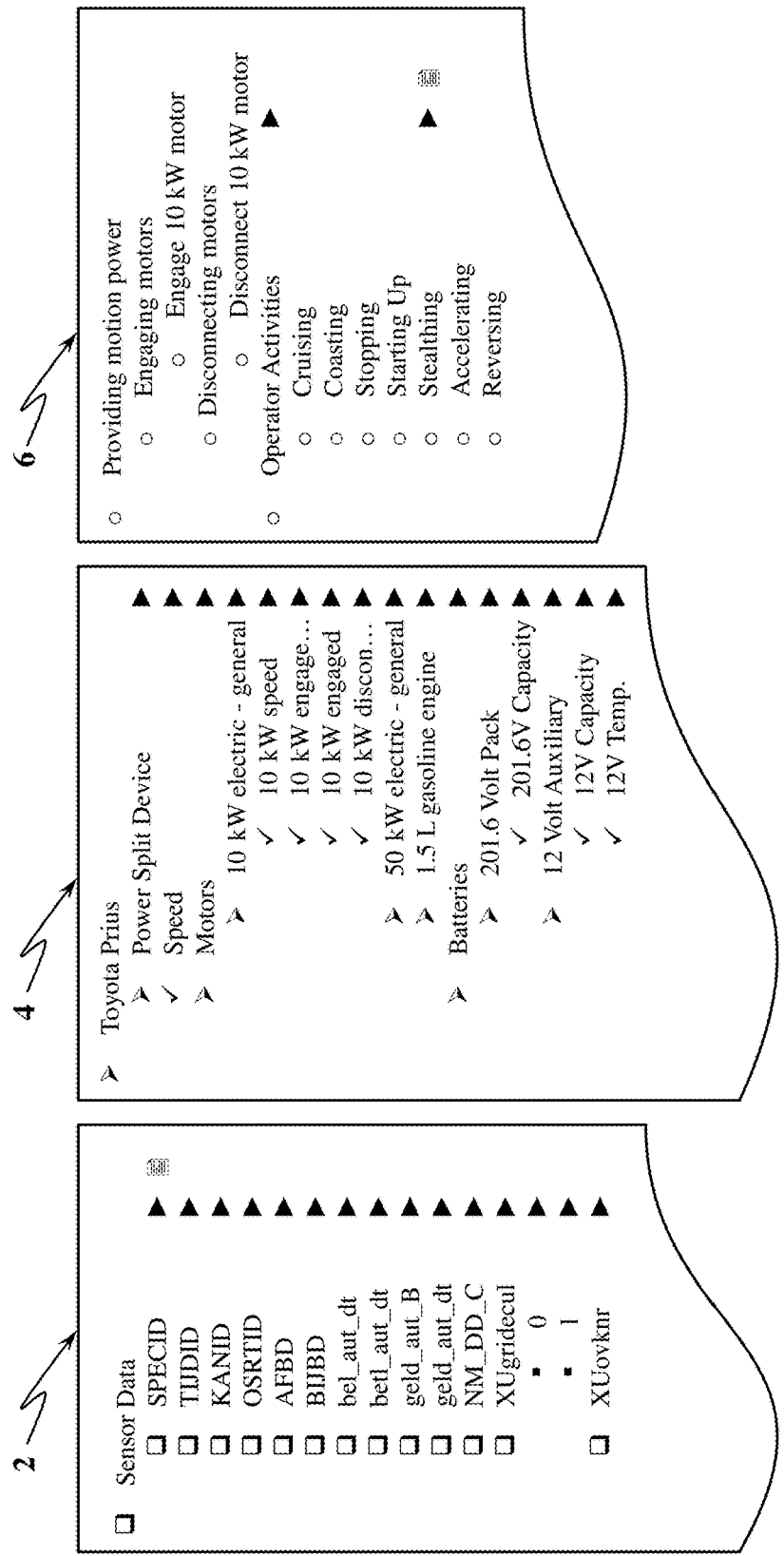
FIG. 1 is a simplified high-level schematic diagram of the input data for a typical architecture of an asset representation for problem-alert aggregation and identifying sub-optimal behavior in an exemplary asset, according to embodiments of the present invention.

Referring to the drawings, FIG. 1 is a simplified high-level schematic diagram of the input data for a typical architecture of an asset representation for problem-alert aggregation and identifying sub-optimal behavior, according to embodiments of the present invention. A sensor-data panel 2 of the system is depicted containing the names of sensors as designated in the header of the measurements dataset, with optional metadata and remarks. The sensor names (demarked with a "☐" symbol in FIG. 1) are associated with a measured attribute in the asset or process structures. Some of the sensors may have only categorical values, demarked with a "■" symbol in FIG. 1. Elements in FIG. 1 that are flagged (demarked with a "▶" symbol) indicate that such elements are being actively monitored.

FIG. 1 provides an exemplary embodiment involving a sensor-incorporated, asset representation of a Toyota Prius vehicle. Alerts produced using existing machine-learning algorithms would read, for example, "problem detected in AFBD" or "NM_DD_C reading is too high." Such alert information obscures identification and localization of the real problem and its cause.

The system of FIG. 1 guides and monitors the asset expert in the asset-representation creation process, ensuring that sensor-incorporated, asset representations produced by the system match asset-representation requirements. The system can be used to model any asset, including a machine, plant, refinery, or factory.

The system has no knowledge of, or access to, the asset. Hence, the system cannot verify that the asset representation is a faithful representation of the asset. The system is responsible for the resulting representation being valid in order to be used for alert aggregation. The system replaces the modeling-language expert who communicates with the "asset expert" in traditional modeling systems, providing the asset expert with a simple and well-defined procedure to model his asset on his/her own.

An asset-structure panel 4 of the system is depicted containing the asset's hierarchical object structure. Notice that an object can be an item that contains other entities. In the exemplary embodiment of FIG. 1, the asset is a Toyota Prius vehicle. Thus, the main asset (as depicted in asset-structure panel 4) is "Toyota Prius," which includes the objects of "Power Split Device," "Motor," and "Batteries." Each of the objects (demarked with a "➤" symbol in FIG. 1) can have attributes (demarked with a "✓" symbol in FIG. 1), which are not objects, but properties of their parent object. In FIG. 1, the "Toyota Prius" asset has the attribute "speed." A sensor from sensor-data panel 2 may be associated with a measured attribute such as the speed attribute.

An asset-behavior panel 6 of the system is depicted containing hierarchical processes (demarked with a "○" in FIG. 1) in the asset. The root process for asset-behavior panel 6 embodies the main function of the asset (e.g., driving). In FIG. 1, the main function of the asset has no name, although the main function could have been titled "traveling from place to place." The main function of asset-behavior panel 6 contains the two main processes of "Providing motion power" and "Operator Activities," each having sub-processes (e.g., "Engaging motors" and "Cruising"). Processes may be connected to objects in asset-structure panel 4, which may influence, or be influenced by, a process.

Figure 2:
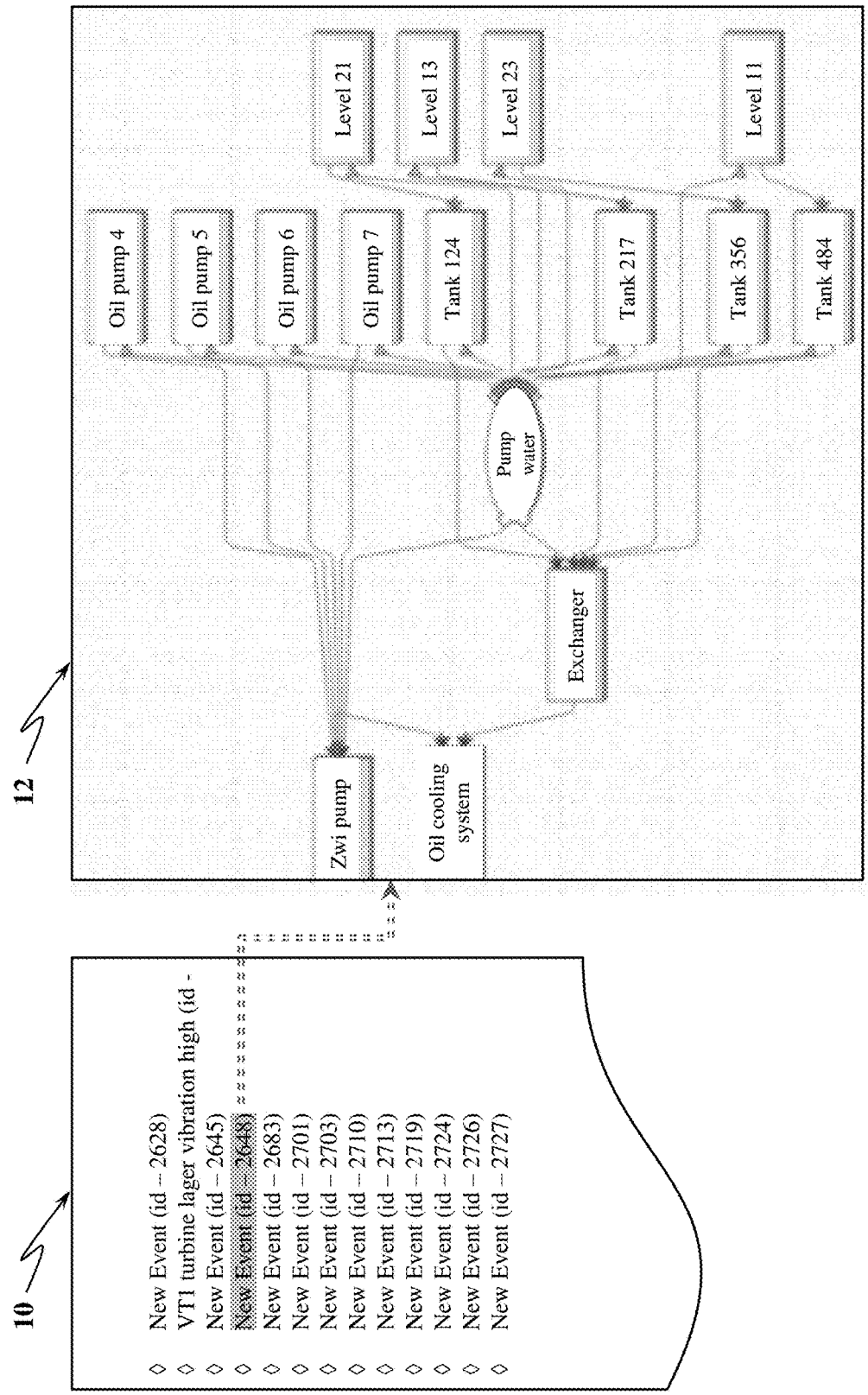
FIG. 2 is a simplified high-level schematic diagram of an event sub-tree of an Asset Data Graph (ADG) produced from the asset representation of FIG. 1 and an ADG of a given exemplary event, according to embodiments of the present invention.

FIG. 2 is a simplified high-level schematic diagram of an event sub-tree of an ADG produced from the asset representation of FIG. 1 and an ADG of a given exemplary event, according to embodiments of the present invention.

The output of the system depicted in FIG. 1 is a sensor-incorporated, asset representation, which is converted into ADGs for automatically querying using standard query libraries on the AGDs. The replies of a predefined set of queries are required to match the replies of an asset expert, and are described in terms which are fully understood by the asset expert.

All elements of an ADG, whether sensor elements, entity elements (i.e., object elements and/or process elements), or attribute elements, may include additional metadata and information such as detailed explanations or references to a user-guide or problem resolution manual. Data measurements and sensors are connected to the attributes measured, and in turn such attributes are connected to the relevant entities in the ADG, which makes the data a native part of the ADG.

Alerts are aggregated into events, which are identified and scored (e.g., reflecting event importance, relevance, or significance) according to the asset representation or the ADG. Such aggregation typically yields a few focused events. Each alert originates from at least one sensor, which is connected to an attribute that describes an entity in the ADG. All alerts triggered by neighboring, dependent, similar or process-connected entities of the asset representation are accumulated into a single event. A resulting event is expressed in the terms used to describe the relevant elements of the asset in the asset representation, which are the terms and expressions used and understood by the maintenance and security team.

In one embodiment, it is assumed that: (1) problems start small, (2) problems don't disappear without intervention, (3) problems grow and accelerate if not dealt with, and (4) the probability of more than one problem occurring at a given time is practically zero.

In FIG. 2, an event-reporting panel 10 of the system is depicted containing a hierarchical event sub-tree (i.e., listing) in which each event (demarked with a "◇" symbol in FIG. 2) is associated with a set of accumulated, correlated alerts (as described above). An ADG 12 of a given exemplary event ("New Event (id—2648)") of the asset representation of the specific asset is depicted in FIG. 2 as well.

An event score is attached to each event, indicating the likelihood that the event is a problem in the asset (e.g., machine, system, refinery, plant, or factory). In one embodiment, the event score relies on one or more of the following aspects.

1. Alert Likelihood—the likelihood (L) that the alerts in an event do not describe a normal-working asset.
2. Score Trend—L exhibits a trend in which event scores are higher if L increases with time.
3. ADG Weighting—the ADG's "vertices" (i.e., entities), "edges" (i.e., linkages between two entities in the ADG), and/or "paths" (i.e., series of connecting edges) involved in the alerts of the event are weighted. In one embodiment, such weighting is heuristic, while in another embodiment the weighting is produced by a graph-type, machine-learning algorithm, which obtains the ADG and optional data as input.
4. Event Focus—If all alerts come from a focused part of the ADG, as depicted in ADG 12 of FIG. 2, the event score is high. If the alerts come from all over the asset, the event score is low. Several measures reflect the focus of an event including:
    a. an alert's associated entities are hierarchical dependents (i.e., have a mutual parent entity) of other entities involved in the alert,
    b. the relation above can extend only to a preset number of generations, and
    c. the greater the number of "paths" (described below) between an alert's associated entities, the more connected the entities are.

Figure 3:
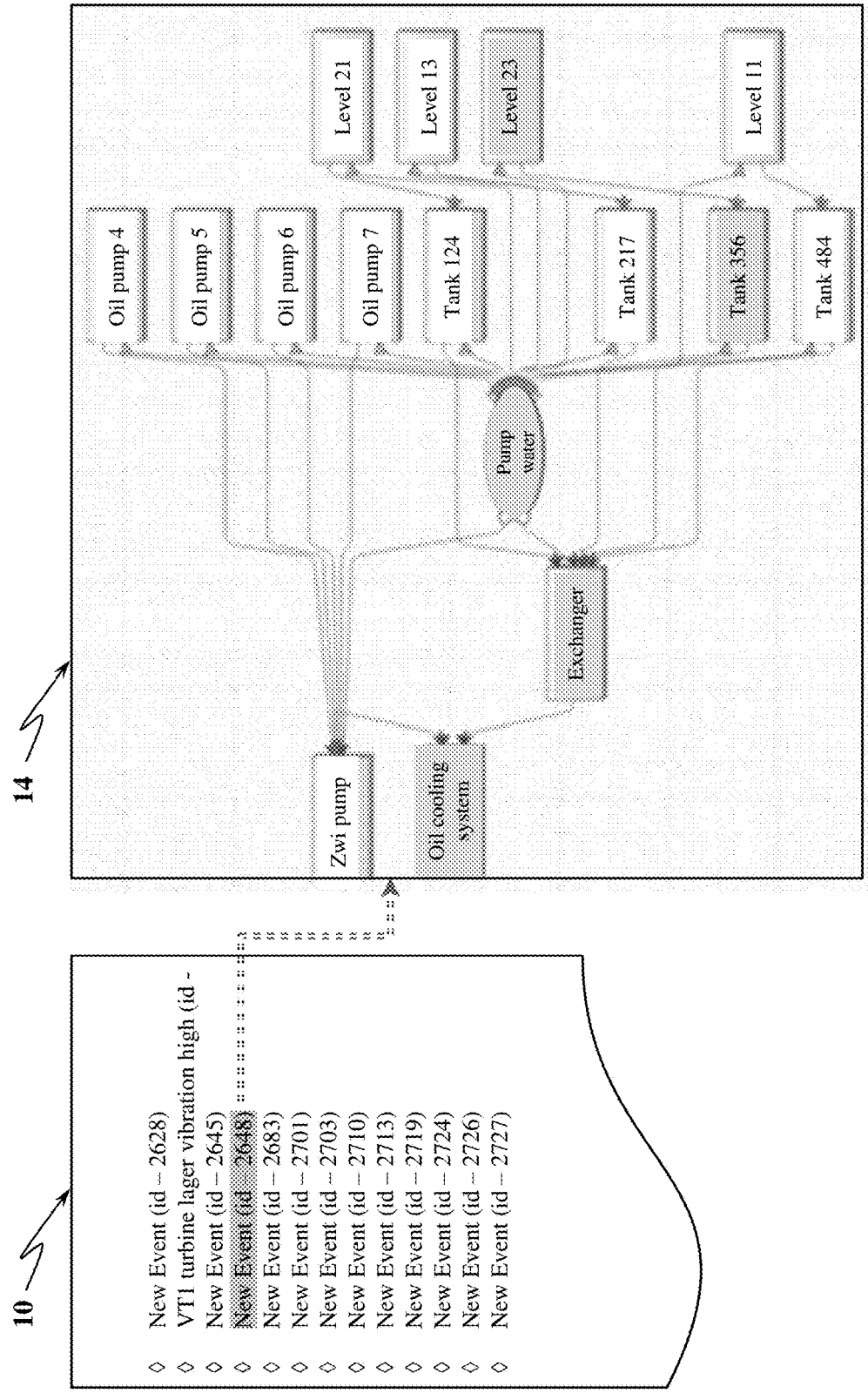
FIG. 3 is a simplified high-level schematic diagram of the event sub-tree and the exemplary ADG of FIG. 2 depicting a path between two objects in the asset, according to embodiments of the present invention.

FIG. 3 is a simplified high-level schematic diagram of the event sub-tree and the exemplary ADG of FIG. 2 depicting a path between two objects in the asset, according to embodiments of the present invention. The path depicted (i.e., highlighted by the indicated, greyed event elements) in an ADG 14 of FIG. 3 associates various asset-representation elements (i.e., "Oil cooling system," "Exchanger," "Pump water," "Tank 356," and "Level 23").

In many cases, the alerts do not accumulate, or an "accumulated" event does not increase or even vanish. Based on the above assumptions, such events represent noise, resulting in a very low event score.

In some exemplary use-cases, an event may be identified by a specific pattern of alerts in a specific type of object. In some use-cases, the object is general (i.e., any object) with a significant pattern of triggering alerts from a single sensor, which is not supported by information obtained from neighboring or process-connected entities of the asset representation. Such scenarios are ascribed to the specific triggering sensor becoming defective, which results in adding the event to a faulty-sensor list instead of an active-event list. Identifying such faulty-sensor alerts significantly reduces treatment urgency, and reduces the workload for the maintenance team.

As an exemplary use-case, the specific type of object may be a pipe with a demonstrated pattern of an increase in the measured capacity that flows through the entrance valve of the pipe. Thus, the identified event would be a leakage in the pipe.

As another exemplary use-case, the specific type of object may be a sheet-metal cutter with an exhibited pattern as a function of the vibrations and moving velocity of the cutter, indicating the likelihood that the identified event occurred.

Thus, the identified event would be a defective metal sample. In another exemplary use-case, the identified event may be a defective product or problematic chemical sample.

As yet another exemplary use-case, a pattern that predicts the occurrence of the identified event may be learned by a machine-learning algorithm, which obtains the relevant ADG or the asset representation as input.

As yet another exemplary use-case, a specific pattern may be identified that an object is not working for one or more of its associated objects. In such a case, the identified event would be a "silent" event which is neither published in the active-event list, nor in a watch-event list, since the event doesn't require the involvement of the maintenance team. Instead, the silent event is the source of input for statistics about the working hours of the object, both in the past and future (i.e., prediction). Such statistics are used for scheduling maintenance visits.

In yet another exemplary use-case, the most-likely value of a feature of an object or process in the asset may be predicted. In one embodiment, the machine-learning algorithm used to learn and predict the value of the feature utilizes deep learning with a deep-network architecture derived from the ADG of the asset. In yet another embodiment, a graph-based, machine-learning algorithm may be used with the deep network derived from the ADG of such an asset.

Thus, the data-driven alerts can be associated with real-world data measured and/or detected from the asset, for a complex physical system having a main activity, with entities as physical objects and/or processes of the asset, and with the entities adapted to act together to achieve the main activity. An an asset representation of the asset can be produced including interrelations between the objects, the processes, and sensors associated with the entities of the asset.

With the data-driven alerts associated with the respective entities which are interrelated in the asset representation, the data-driven alerts can be aggregated into events in the asset representation in which the events are groupings of related data-driven alerts having related entities according to the asset representation. Each event can then be scored into an event score, representing an event importance, an event urgency, an event relevance, and/or an event significance. A selected subset of the events and respective event scores can then be generated in which the selected subset is based on the event scores.

Furthermore, an event may be specifically identified as an asset failure, a problematic entity, a faulty sensor, a user-induced change, a maintenance procedure, a user error, an inactive object, a problematic entity, an inactive object component, an object component requiring maintenance, a faulty object component, a leaking pipe, a defective product produced by an entity or the asset, and/or a problematic chemical sample produced by an entity or the asset.

Furthermore, the aggregation process may include extracting designated sub-representations of the respective entities, and aggregating similar and/or connected designated sub-representations, or deviations from the designated sub-representations, into a designated event.

Moreover, an interconnected representation of a complex physical operation can be produced for identifying suboptimal behavior. This involves creating a sensor listing having all relevant sensors, all relevant measurements, and/or all relevant sensor-data columns in a database, related to the real-world data measured and/or detected in an asset; creating an object listing having a relevant object in the asset; creating a process listing having a relevant process in the asset; and creating a set of entity connections by associating listing elements in the sensor listing, the object listing, and the process listing.

By iterating the above to refine the object listing, the process listing, and the entity connections until all relevant objects, and all relevant processes in the asset are properly listed and correspondingly associated into an asset representation of the asset, the interconnected representation can be produced. By utilizing the asset representation, a relevant object or relevant process which is impairing the asset from optimally performing, conducting, and/or achieving the main activity or a sub-aspect therein can be identified.

Furthermore, the iterating may include refining the process listing and the entity connections until each relevant sensor listed relates to a given object or a given process, and each relevant process listed relates at least two different objects from the object listing.

Furthermore, the object listing and process listing may include respective object attributes and process attributes, which are properties of their respectively associated entities, with the sensor listing having categorical values associated with the relevant sensors and measurements. This enables identifying a relevant object attribute, process attribute, categorical value which is impairing the asset from optimally performing, conducting, and/or achieving the main activity or a sub-aspect therein.

Furthermore, the asset representation may be configured to produce equivalent replies to a predefined set of queries as a manual investigation of the asset. Moreover, the asset representation may be configured to be portrayed as an ADG, which is a graph with a set of vertices connected with edges, configured to be queried automatically, and in which the ADG is configured to produce equivalent replies to a predefined set of queries as the asset representation.

Furthermore, the asset representation may be configured to be portrayed as a graph, configured to be queried automatically, and to serve as the basis on which a machine-learning algorithm or a deep-learning algorithm can be executed.

Furthermore, the asset representation may be used to extract an entity importance of an entity, of a linkage between two or more entities, and/or of the real-world data associated with an entity in which the entity importance is based on: (i) the asset representation or a derivative asset representation; and (ii) the real-world data measured and/or detected from the relevant sensors associated with the asset representation or with a derivative asset representation.

Furthermore, the asset representation may be used to predict an attribute value of an entity in the asset in which the attribute value is based on: (i) the asset representation or a derivative asset representation; and (ii) the real-world data measured and/or detected from the relevant sensors associated with the asset representation or with a derivative asset representation.

While the present invention has been described with respect to a limited number of embodiments, it will be appreciated that many variations, modifications, and other applications of the present invention may be made.

What is claimed is:

1. A method for problem-alert aggregation, the method comprising the steps of:
   (a) providing data-driven alerts for an asset, wherein:
      (i) said data-driven alerts associate real-world data measured and/or detected from said asset;
      (ii) said asset is a complex physical system having a main activity;
      (iii) an object is a physical item;

(iv) a process is a non-physical item that influences at least one object;
(v) entities are physical objects and/or processes of said asset; and
(vi) said entities are adapted to act together to achieve said main activity;
(b) providing an asset representation of said asset, wherein said asset representation includes:
(i) representations of at least two objects of said asset and at least two processes of said asset;
(ii) representations of at least two sensors associated with said entities of said asset; and
(iii) interrelations between said objects, said processes, and said sensors associated with said entities of said asset;
(c) associating said data-driven alerts with respective said entities that are interrelated in said asset representation;
(d) aggregating said data-driven alerts into events in said asset representation, wherein said events are groupings of related data-driven alerts having related entities according to said asset representation;
(e) scoring each said event into an event score, wherein said event score represents an event importance, an event urgency, an event relevance, and/or an event significance;
(f) generating a selected subset of said events and respective event scores, wherein said selected subset is based on said event scores; and
(g) removing false, low-likelihood, unimportant, low-urgency, irrelevant and/or insignificant problem-alerts from said data-driven alerts based on said event scores.

2. The method of claim 1, wherein at least one said event is identified as belonging to at least one specifically-identified event selected from the group consisting of: an asset failure, a problematic entity, a faulty sensor, a user-induced change, a maintenance procedure, a user error, an inactive object, a problematic entity, an inactive object component, an object component requiring maintenance, a faulty object component, a leaking pipe, a defective product produced by an entity or said asset, and a problematic chemical sample produced by an entity or said asset.

3. The method of claim 1, wherein said step of aggregating includes:
(i) extracting designated sub-representations of said respective entities; and
(ii) aggregating similar and/or connected said designated sub-representations, or deviations from said designated sub-representations, into a designated event.

4. A method for producing an interconnected representation of a complex physical operation for identifying sub-optimal behavior, the method comprising the steps of:
(a) creating a sensor listing, wherein:
(i) said sensor listing includes all relevant sensors, all relevant measurements, and/or all relevant sensor-data columns in a database, related to real-world data measured and/or detected in an asset;
(ii) said asset is a complex physical system having a main activity;
(iii) an object is a physical item;
(iv) a process is a non-physical item that influences at least one object;
(v) entities are physical objects and/or processes of said asset; and
(vi) said entities are adapted to act together to achieve said main activity;
(b) creating an object listing, wherein said object listing includes at least one relevant object in said asset;
(c) creating a process listing, wherein said process listing includes at least one relevant process in said asset;
(d) creating a set of entity connections by associating listing elements in said sensor listing, said object listing, and said process listing;
(e) iterating said steps (b)-(d) to refine said object listing, said process listing, and said entity connections until:
(i) said object listing includes at least two said relevant objects and said process listing includes at least two said relevant processes in said asset; and
(ii) all relevant objects and all relevant processes in said asset are properly listed and correspondingly associated into an asset representation of said asset, thereby producing the interconnected representation;
(f) identifying, by utilizing said asset representation, at least one said relevant object and/or at least one said relevant process that is impairing said asset from optimally performing, conducting, and/or achieving said main activity or a sub-aspect of said main activity; and
(g) generating at least one alert associated with said at least one relevant object and/or said at least one relevant process that is impairing said asset.

5. The method of claim 4, wherein said step of iterating includes iterating to refine said process listing and said entity connections until each said relevant sensor listed relates to a given said object or a given said process, and each said relevant process listed relates at least two different said objects from said object listing.

6. The method of claim 4, wherein said object listing includes object attributes associated with said objects, and wherein said process listing includes process attributes associated with said processes, wherein said object attributes and said process attributes are properties of their respectively associated entities, and wherein said sensor listing includes categorical values associated with said relevant sensors and said relevant measurements, and wherein said step of identifying includes identifying at least one relevant said object attribute, at least one relevant said process attribute, or at least one relevant said categorical value that is impairing said asset from optimally performing, conducting, and/or achieving said main activity or a sub-aspect of said main activity.

7. The method of claim 4, wherein said asset representation is configured to produce equivalent replies to a predefined set of queries as a manual investigation of said asset.

8. The method of claim 4, wherein said asset representation is configured to be portrayed as an Asset Data Graph (ADG), wherein said ADG is a graph with a set of vertices connected with edges, configured to be queried automatically, and wherein said ADG is configured to produce equivalent replies to a predefined set of queries as said asset representation.

9. The method of claim 4, wherein said asset representation is configured to be portrayed as a graph, wherein said graph is a set of vertices connected with edges, configured to be queried automatically, and wherein said graph is the basis on which a machine-learning algorithm or a deep-learning algorithm can be executed.

10. The method of claim 4, the method further comprising the step of:
(h) extracting an entity importance of at least one said entity, of a linkage between at least two said entities, and/or of said real-world data associated with said at least one entity, wherein said entity importance is based on:
(i) said asset representation or a derivative representation of said asset representation; and (ii) said real-world data measured and/or detected from said relevant sensors associated with said asset representation or with a derivative representation of said asset representation.

11. The method of claim 4, the method further comprising the step of:
   (h) predicting at least one attribute value of at least one said entity in said asset, wherein said at least one attribute value is based on:
      (i) said asset representation or a derivative representation of said asset representation; and
      (ii) said real-world data measured and/or detected from said relevant sensors associated with said asset representation or with a derivative representation of said asset representation.

12. A system for problem-alert aggregation, the system comprising:
   (a) a CPU for performing computational operations;
   (b) a memory module for storing data;
   (c) an alert-aggregation module configured for:
      (i) providing data-driven alerts for an asset, wherein:
         (A) said data-driven alerts associate real-world data measured and/or detected from said asset;
         (B) said asset is a complex physical system having a main activity;
         (C) an object is a physical item;
         (D) a process is a non-physical item that influences at least one object;
         (E) entities are physical objects and/or processes of said asset; and
         (F) said entities are adapted to act together to achieve said main activity;
      (ii) providing an asset representation of said asset, wherein said asset representation includes:
         (A) representations of at least two objects of said asset and at least two processes of said asset;
         (B) representations of at least two sensors associated with said entities of said asset; and
         (C) interrelations between said objects, said processes, and said sensors associated with said entities of said asset;
      (iii) associating said data-driven alerts with respective said entities that are interrelated in said asset representation;
      (iv) aggregating said data-driven alerts into events in said asset representation, wherein said events are groupings of related data-driven alerts having related entities according to said asset representation;
      (v) scoring each said event into an event score, wherein said event score represents an event importance, an event urgency, an event relevance, and/or an event significance;
      (vi) generating a selected subset of said events and respective event scores, wherein said selected subset is based on said event scores; and
      (vii) removing false, low-likelihood, unimportant, low-urgency, irrelevant and/or insignificant problem-alerts from said data-driven alerts based on said event scores.

13. A non-transitory computer-readable storage medium, having computer-readable code embodied on the non-transitory computer-readable storage medium, for problem-alert aggregation, the computer-readable code comprising:
   (a) program code for providing data-driven alerts for an asset, wherein:
      (i) said data-driven alerts associate real-world data measured and/or detected from said asset;
      (ii) said asset is a complex physical system having a main activity;
      (iii) an object is a physical item;
      (iv) a process is a non-physical item that influences at least one object;
      (v) entities are physical objects and/or processes of said asset; and
      (vi) said entities are adapted to act together to achieve said main activity;
   (b) program code for providing an asset representation of said asset, wherein said asset representation includes:
      (i) representations of at least two objects of said asset and at least two processes of said asset;
      (ii) representations of at least two sensors associated with said entities of said asset; and
      (iii) interrelations between said objects, said processes, and said sensors associated with said entities of said asset;
   (c) program code for associating said data-driven alerts with respective said entities that are interrelated in said asset representation;
   (d) program code for aggregating said data-driven alerts into events in said asset representation, wherein said events are groupings of related data-driven alerts having related entities according to said asset representation;
   (e) program code for scoring each said event into an event score, wherein said event score represents an event importance, an event urgency, an event relevance, and/or an event significance;
   (f) program code for generating a selected subset of said events and respective event scores, wherein said selected subset is based on said event scores; and
   (g) program code for removing false, low-likelihood, unimportant, low-urgency, irrelevant and/or insignificant problem-alerts from said data-driven alerts based on said event scores.

14. A system for producing an interconnected representation of a complex physical operation for identifying suboptimal behavior, the system comprising:
   (a) a CPU for performing computational operations;
   (b) a memory module for storing data;
   (c) an asset-representation module configured for:
      (i) creating a sensor listing, wherein:
         (A) said sensor listing includes all relevant sensors, all relevant measurements, and/or all relevant sensor-data columns in a database, related to real-world data measured and/or detected in an asset;
         (B) said asset is a complex physical system having a main activity;
         (C) an object is a physical item;
         (D) a process is a non-physical item that influences at least one object;
         (E) entities are physical objects and/or processes of said asset; and
         (F) said entities are adapted to act together to achieve said main activity;
      (ii) creating an object listing, wherein said object listing includes at least one relevant object in said asset;
      (iii) creating a process listing, wherein said process listing includes at least one relevant process in said asset;
      (iv) creating a set of entity connections by associating listing elements in said sensor listing, said object listing, and said process listing;

(v) iterating said module functions (ii)-(iv) to refine said object listing, said process listing, and said entity connections until:
  (A) said object listing includes at least two said relevant objects and said process listing includes at least two said relevant processes in said asset; and
  (B) all relevant objects and all relevant processes in said asset are properly listed and correspondingly associated into an asset representation of said asset, thereby producing the interconnected representation;
(vi) identifying, by utilizing said asset representation, at least one said relevant object and/or at least one said relevant process that is impairing said asset from optimally performing, conducting, and/or achieving said main activity or a sub-aspect of said main activity; and
(vii) generating at least one alert associated with said at least one relevant object and/or said at least one relevant process that is impairing said asset.

15. A non-transitory computer-readable storage medium, having computer-readable code embodied on the non-transitory computer-readable storage medium, for producing an interconnected representation of a complex physical operation for identifying sub-optimal behavior, the computer-readable code comprising:
(a) program code for creating a sensor listing, wherein:
  (i) said sensor listing includes all relevant sensors, all relevant measurements, and/or all relevant sensor-data columns in a database, related to real-world data measured and/or detected in an asset;
  (ii) said asset is a complex physical system having a main activity;
  (iii) an object is a physical item;
  (iv) a process is a non-physical item that influences at least one object;
  (v) entities are physical objects and/or processes of said asset; and
  (vi) said entities are adapted to act together to achieve said main activity;
(b) program code for creating an object listing, wherein said object listing includes at least one relevant object in said asset;
(c) program code for creating a process listing, wherein said process listing includes at least one relevant process in said asset;
(d) program code for creating a set of entity connections by associating listing elements in said sensor listing, said object listing, and said process listing;
(e) program code for iterating said program-code functions (b)-(d) to refine said object listing, said process listing, and said entity connections until:
  (i) said object listing includes at least two said relevant objects and said process listing includes at least two said relevant processes in said asset; and
  (ii) all relevant objects and all relevant processes in said asset are properly listed and correspondingly associated into an asset representation of said asset, thereby producing the interconnected representation;
(f) program code for identifying, by utilizing said asset representation, at least one said relevant object and/or at least one said relevant process that is impairing said asset from optimally performing, conducting, and/or achieving said main activity or a sub-aspect of said main activity; and
(g) program code for generating at least one alert associated with said at least one relevant object and/or said at least one relevant process that is impairing said asset.

* * * * *